(12) United States Patent
Turcotte et al.

(10) Patent No.: US 6,461,537 B1
(45) Date of Patent: Oct. 8, 2002

(54) WATER REPELLENT GLASS TREATMENT FOR AUTOMOTIVE APPLICATIONS

(75) Inventors: David E. Turcotte, Lexington, KY (US); Frances E. Lockwood, Georgetown, KY (US); Richard J. Baumgart, Paris, KY (US); Michael A. Dituro, Huntington, WV (US); Claude S. Phoenix, Allision Park, PA (US)

(73) Assignee: Ashland Inc., Lexington, KY (US)

( * ) Notice: Subject to any disclaimer, the term of this patent is extended or adjusted under 35 U.S.C. 154(b) by 0 days.

(21) Appl. No.: 09/607,380

(22) Filed: Jun. 30, 2000

Related U.S. Application Data

(63) Continuation-in-part of application No. PCT/US98/27910, filed on Dec. 31, 1998.
(60) Provisional application No. 60/070,371, filed on Jan. 2, 1998.

(51) Int. Cl.$^7$ .............................. C09K 3/18; B05D 3/02; G02B 1/10
(52) U.S. Cl. .............................. 252/194; 106/2; 106/13; 106/287.14; 427/163.1; 427/165; 427/167; 427/168; 428/429; 428/447
(58) Field of Search ........................ 252/194; 427/163.1, 427/165, 167, 168; 106/2, 13, 287.14; 428/429, 447

(56) References Cited

U.S. PATENT DOCUMENTS

| | | |
|---|---|---|
| 3,310,429 A | 3/1967 | Gunnar |
| 3,433,750 A | 3/1969 | Fain |
| 3,766,123 A | 10/1973 | Burnie |
| 3,811,918 A | 5/1974 | Leveue |
| 3,911,166 A | 10/1975 | Bailey |
| 3,935,342 A | 1/1976 | Lim |
| 3,950,588 A | 4/1976 | McDougal |
| 4,301,197 A | 11/1981 | Franz |
| 4,410,563 A | 10/1983 | Richter |
| 4,876,152 A | 10/1989 | Kang |
| 5,221,329 A | 6/1993 | Tarr |
| 5,300,327 A | 4/1994 | Stark-Kasley et al. |
| 5,393,330 A | 2/1995 | Chen et al. |
| 5,415,927 A | 5/1995 | Hirayama |
| 5,421,866 A | 6/1995 | Stark-Kasley et al. |

*Primary Examiner*—Shean C. Wu
(74) *Attorney, Agent, or Firm*—Carrithers Law Office; David W. Carrithers

(57) ABSTRACT

A water repellent glass treatment for automotive applications comprising a windshield washer solvent which contains quaternary compounds, preferably siloxane based quaternary ammonium compounds, fatty quaternary ammonium compounds, and mixtures thereof which are dispersible in water, alcohol's and water alcohol mixtures and imparts a good degree of hydrophobicity to the windshield surface. The fluid is used in underhood washer solvent reservoirs and applied to the windshield of the automobile in the conventional manner and is packaged in diluted solution or a concentrate for addition to the windshield cleaner/solvent solution.

28 Claims, No Drawings

WATER REPELLENT GLASS TREATMENT FOR AUTOMOTIVE APPLICATIONS

This application is a Continuation-In-Part of patent application Ser. No. PCT/US98/27910 filed on Dec. 31, 1998 which claims priority from U.S. Provisional Patent Application Ser. No. 60/070,371 filed on Jan. 2, 1998 both of which are hereby incorporated by reference.

BACKGROUND OF THE INVENTION

1. Technical Field

This invention relates to a water repellent glass treatment for automotive applications comprising a windshield washer solvent which contains quaternary compounds, preferably siloxane based quaternary ammonium compounds, fatty quaternary ammonium compounds, and mixtures thereof which are dispersible in water, alcohol's and water alcohol mixtures and imparts a good degree of hydrophobicity to the windshield surface.

2. Description of the Prior Art

Modern automobiles require frequent attention to the windshield to insure safe operation. The glass must be kept reasonably clean for visibility. Wipers frequently need to be replaced to maintain wet weather visibility while driving, particularly at night. While water can be used in the underhood reservoir for cleaning the windshield during warm weather, the year round need for greater detergency to remove oil, deposits, bird droppings and insect matter dictates the use of a solvent based system. Typically, these systems include a surfactant and are methanol-water based to offer improved freeze protection for the winter. Bittering agents, like denatonium benzoate, are often used. Sometimes isopropyl alcohol is used in conjunction with methanol-water for freeze point depression. In Europe ethanol-water based systems are used for lower mammalian toxicity. Freeze points in the 20° to −40° F. range are common. Dye is often added to allow level recognition in opaque reservoir bottles. Blue is typically used in North American but examples span the palette of color possibilities. Thermal and UV stability are required as well as basic solubility, plastics compatibility and minimal staining.

Conventional windshield cleaner treatments fail to make the glass windshield repel water in outside environments and require constant replenishment. U.S. Pat. No. 3,940,588 teaches coating with hydrolyzable di-silyl poly (perflourooxyalkene) to produce oil and water repellent coatings. U.S. Pat. No. 4,410,563 covers water repellent coatings for optical surfaces including windshields based on Dow Corning 531 and 536 fluids, amino functional polydimethylsiloxane. These approaches require treatment of the subject surface by hand to obtain the coating. The coatings would have to be reapplied at some future point to maintain the water repellent effect. Clark teaches a storage stable water repellent based on an acid neutralized cationic polysiloxane copolymer containing aminofunctional groups in U.S. Pat. No. 3,639,131. The '131 patent is primarily concerned with making an aluminum can storage stable mixture by heating. This mixture is applied to a windshield during rain to render it water repellent. Treatments to modify the glass and make it repel water have also been taught in U.S. Pat. No. 5,415,927 wherein Hirayama uses organic silicon and fluorine compounds to form water repellent layers. These conventional windshield washer solvents fail to provide an instant water repellent automotive glass surface without extensive pretreatment or application surface preparation. Moreover, none of these conventional windshield additive formulas added to a primarily aqueous system utilize a quaternary compound to repel water as does Applicant's invention.

SUMMARY

The instant invention provides a water repellant fluid used in traditional underhood washer solvent reservoirs filled with water or alcohol/water blends with or without detergents, and applied by simply pressing a cabin button to squirt the liquid on the windshield. This eliminates the need for polishing the windshield ahead of time.

It is an object of the present invention to provide a water repellant fluid that is soluble or dispersible in water, alcohols and mixtures of water and alcohols.

It is an object of the present invention to provide a water repellant fluid which does not exhibit build up with repeated use, streak or stain windshields or damage paint.

It is an object of the present invention to provide a water repellant fluid having a pH range of from about 6.0 to 9.0 and more particularly in a range of from about 7.0 to 8.0.

It is an object of the present invention to provide a water repellant fluid which is thermally stable in view of underhood temperatures which can approach 150° F.

It is an object of the present invention to provide a water repellant fluid which does not separate on standing.

It is an object of the present invention to provide a water repellant fluid which does not have objectionable toxicological properties.

It is an object of the present invention to provide a water repellant fluid which does not have objectionable odor.

It is an object of the present invention to provide a water repellant fluid which is compatible with conventionally available washer solvents.

It is an object of the present invention to provide a water repellant fluid which is environmentally benign.

It is an object of the present invention to provide a water repellant fluid which does not negatively impact vision even at night.

It is an object of the present invention to provide a water repellant fluid which will provide a wetting surface having a contact angle which is greater than that of water.

It is an object of the present invention to provide a water repellant fluid which provides a wetting surface having a contact angle which is greater than that of water upon adding at least 0.001 percent of said water repellant fluid to a solvent of water, alcohols, or a water and alcohol mixture.

It is an object of the present invention to provide a water repellant fluid when added to a windshield washer solution in an amount of between 0.001 percent and 1.0% by volume.

It is an object of the present invention to provide a water repellant fluid which provides a wetting surface having a contact angle greater than that of water having a contact angle of from 10 to 15 degrees, when the concentrate is diluted to 15 percent by volume of less with water, alcohol or combinations thereof.

It is another object of the invention to prepare a concentrate which can be diluted to a 1 percent by weight solution when added to a water, alcohol, or water and alcohol mix providing an effective water repelling surface treatment.

It is another object of the invention to provide a concentrate which can be diluted to a 1 percent by weight solution in a water and alcohol mixture containing alcohol in amounts ranging from 5 to 50 weight percent and provide an effective water repelling surface treatment.

These and other objects of the present invention will be more fully understood from the following description of the invention.

DESCRIPTION OF THE PREFERRED EMBODIMENT

A water repellent glass treatment for automotive applications comprising a windshield washer treatment which contains a quaternary compound, preferably a siloxane based quaternary ammonium compounds, fatty quaternary ammonium compounds, and mixtures thereof which are dispersible in water, alcohol's and water alcohol mixtures and imparts a good degree of hydrophobicity to the windshield surface which traditiionally consists of a glass substrate or clear or translucent polymer.

Silicone

Any of a large group of siloxane polymers based on a structure consisting of alternate silicon and oxygen atoms with various organic radicals attached to the silicon.

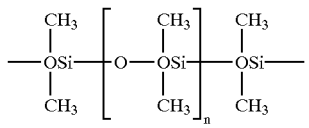

Siloxane

A straight-chain compound consisting of silicon atoms single-bonded to oxygen and so arranged that each silicon atom is linked with four oxygen atoms.

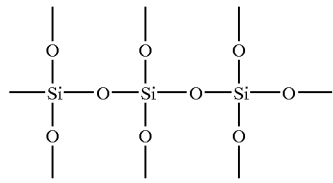

In particular, polydimethyl siloxane based quaternary ammonium compounds with molecular weights ranging from about 300 to about 500,000 and $C_8$–$C_{24}$ fatty based quaternary compounds, either on their own or preferably in combination thereof, which is dispersible or soluble in water or alcohol, or in water and alcohol mixtures. Moreover, these compounds individually or together may be made dispersible or soluble in water, alcohol, or mixtures thereof through the use of various emulsifiers or cosolubilizers which impart a good degree of hydrophobicity to the windshield surface.

Fatty Quaternary Compounds

Fatty quaternary compounds are typically quaternary ammonium salts which are a type of organic nitrogen compound in which the molecular structure includes a central nitrogen atom joined to four organic groups (the cation) and a negatively charged acid radical (the anion). The structure is indicated as:

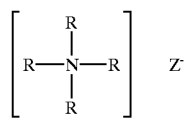

The $C_8$–$C_{24}$ fatty quaternary compounds include mono and/or di-alkyl amido amine quats, imidazoline quats, di-amido quats, di-methyl ammonium chloride quats, tri-methyl ammonium chloride quats, di-methyl benzyl quats, and other fatty quaternary compounds. Pentavelent nitrogen ring compounds, such as lauryl pyridinium chloride, are also considered quaternary ammonium compounds. They are all cationic surface-active coordination compounds and tend to be adsorbed on surfaces.

Other Additives

Optionally, other components including dyes, such as LIQUITINT teal dye, in amounts ranging from 0.1 to 1.0 percent by weight; bittering agents, such as BITTREX EA, in amounts ranging from 0.1 to 3.0 percent by weight; biocides; and the like may be added to the present formulation.

One embodiment of the present invention consists of a quaternary ammonium salt of a polydimethyl siloxane with a fatty acid and a weight distribution range of from between about 300 and 2000 which is dispersible in water, alcohol's and water alcohol mixtures.

Another preferred water repellant compound comprises both a water dispersible high molecular weight polydimethyl siloxane based quaternary ammonium compound and a water dispersible $C_8$–$C_{24}$ fatty based quaternary compound having a cationic functional group in an alcohol solvent sold under the trademark of PR 1145 manufactured by Siltech Corporation of Toronto, Canada. The high molecular weight polydimethyl siloxane compound is present in an amount up to 85 percent by weight and more preferably from between 0.1 and 85 percent by weight and the water dispersible $C_8$–$C_{24}$ fatty based quaternary compound having a cationic functional group is present in an amount up to 50 percent by weight and preferably from between 0.01 and 50 percent by weight; an alcohol solvent such as dipropylene glycol ranging in an amount of from about 1 to 50 percent and preferably in an amount ranging from about 5 to 35 percent by volume is incorporated therein. A surfactant, such as a silicon surfactant may optionally added to the composition in amounts ranging from 0.001 to about 10 percent; and water.

Yet another preferred embodiment of the present invention is a water repellant treatment concentrate for dilution with a windshield washing solvent, wherein the concentrate comprises a combination of a high molecular weight silicon quaternary compound and an alkanolamide, a nonsilicon quaternary compound. The high molecular weight silicon compound is present in an amount of from between 0.01 and 99 percent by weight and the alkanolamide is present in an amount of from between 0.01 and 99 percent by weight; more preferably the high molecular weight silicon compound is present in an amount of from between 5 and 85 percent by weight and the alkanolamide is present in an amount of from between 5 and 95 percent by weight; more preferably wherein the high molecular weight silicon compound is present in an amount of from between 55 and 65 percent by weight and the alkanolamide is present in an amount of from between 5 and 45 percent by weight.

Moreover, the high molecular weight silicon compound may be is a solution of an alcohol such as dipropylene glycol ranging in an amount of from about 0.1 to 50 percent and preferably in an amount ranging from about 5 to 35 percent and more preferably in an amount ranging from about 15 to 20 percent by volume. A surfactant, such as a silicon surfactant may be added to the composition in amounts ranging from 0.001 to 10 percent and preferably from about 0.01 to 6 percent.

Typically, a preferred embodiment would comprise a high molecular weight silicon quaternary compound in an amount ranging from about 45 to 65 percent in a dipropylene glycol solvent in an amount ranging from about 5 to 35 percent, combined with an alkanolamide in amount ranging from about 5 to 35 percent, and a surfactant in an amount ranging from about 0.01 to 10 percent.

Selection of a water dispersible high molecular weight polydimethyl siloxane based quaternary ammonium compound and a water dispersible $C_8$–$C_{24}$ fatty based quaternary compound having a cationic functional group provides a method of interacting with the glass substrate. The glass substrate such as a windshield of an automobile or canopy or an airplane, are anionic in nature stemming from partially charged bridging and fully charged terminal oxygens in the borosilicate glass network. The quaternary compound's cationic functional group, ("head"), adheres to the anionically charged glass. The hydrophobic functional group of the compound, ("tail"), repels water at the interface. The mechanism is limited in that once the charge on the glass is compensated, further buildup beyond the molecular layer is limited. A second molecular layer of tail to tail interaction is theoretically possible, but is so weakly bound that it, and higher order interactions can be ignored providing a thin film which increases the contact angle and hydrophobicity of the surface and still resists buildup.

As set forth in Table 1, the contact angles of quaternary compounds suitable for use for increasing the contact angle of the surface above that of water are shown in a 1.0% solution, a 100 parts per million, (ppm), (0.01%) solution, and a 200 ppm (0.02%) solution. More particularly, the embodiments of polydimethyl siloxane based quaternary ammonium compounds and water dispersible $C_8$–$C_{24}$ fatty based quaternary compounds are selected from the group comprising: A. SILQUAT D10-B, a low molecular weight silicon quat; B. SILTECH NS SAQ, a nonsilicon alkyl amido dimethyl quat; C. a blend of a low molecular weight silicon quat and a nonsilicon alkyl amido dimethyl quat; D. SILQUAT J15-NO, a blend of a nonsilicon dialkyl amido amine quat and a high molecular weight silicon quat; E. a nonsilicon dialkyl amido amine quat; F. SILQUAT J15-NO, a high molecular weight silicon quat; G. a blend of a high molecular weight silicon quat in a dipropylene glycol solvent and a dialkyl amido amine quat; H. SILQUAT J15-B, a high molecular weight silicone quat in an alcohol solvent; I. SILQUAT J15-D, a high molecular weight silicone quat in a dipropylene glycol solvent; J. SILQUAT J15-D-60, a high molecular weight silicone quat; K. a blend of SILQUAT J15-B and a dialkyl amido amine quat; L. SILQUAT NS SAQ, a 50/50 blend of SILQUAT J15-B, a high molecular weight silicone quat in an alcohol solvent, and an alkyl amido dimethyl quat; M. SILQUAT NS SAQ, a 80/20 blend of SILQUAT J15-B, a high molecular weight quat in alcohol, and an alkyl amido dimethyl quat; N. a high molecular weight silicone quat and a alkyl amido dimethyl quat; O. a dialkl diamido quat; P. a dialkyl imidazoline quat; Q. an alkyl dimethyl benzyl quat; R. a dialkyldimethyl quat; S. an alkyl trimethyl quat; and T., a blend of SILTECH J15-B high molecular weight silicone quat in an alcohol solvent and alkanolamide.

TABLE 1

CONTACT ANGLES OF QUATERNARY COMPOUNDS

| Product | 1% | 100 PPM | 200 PPM |
|---|---|---|---|
| A. Silquat D10-B. Low mol. wt. silicone quat. | 89.4 | 85.2 | |
| B. Siltech NS 5AQ. Alkyl Amido Dimethyl Quat. | 74.5 | 71.1 | |
| C. Blend of A & B. | 81.8 | 80.1 | |
| D. Blend Dialkyl Amido Amine Quat. + high mol. wt. silicone quat. (Silquat J15-NO). | 88.4 | 89.1 | |
| E. Dialkyl Amido Amine Quat. | 88.5 | 85.7 | |
| F. Silquat J15-NO. High mol. wt. silicone quat. | 104.7 | 88.9 | |
| G. Blend of Silquat J15-D & Dialkyl Amido Amine Quat. | 90.3 | 87.6 | |
| H. Silquat J15-B. High mol. wt. silicone quat. | 101.05 | | 98.69 |
| I. Silquat J15-D. High mol. wt. silicone quat. | 100.74 | | 90.25 |
| J. Silquat J15-D-60. High mol. wt. silicone quat. | 101.73 | | 90.46 |
| K. Silquat J15-B & Dialkyl Amido Amine Quat. | 84.5 | | 90.3 |
| L. Silquat J15-B & Alkyl Amido Dimethyl Quat. (Silquat NS SAQ). 50:50 blend. | 77.0 | | 90.6 |
| M. Silquat J15-B high mol. wt. silicone quat. & Alkyl Amido Dimethyl Quat. (Silquat NS SAQ). 80:20 blend. | 89.2 | | 92.4 |
| N. Silquat J15-D high mol. wt. silicone quat. & Alkyl Amido Dimethyl Quat. (Silquat NS SAQ). | 92.4 | | 89.7 |
| O. Dialkyl Diamido Quat. | 80.5 | | 89.5 |
| P. Dialkyl Imidazoline Quat. | 72.3 | | 82.7 |
| Q. Alkyl Dimethyl Benzyl Quat. | 74.5 | | 74.3 |
| R. Dialkyldimethyl Quat. | 80.7 | | 83.1 |
| S. Alkyl Trimethyl Quat. | 83.2 | | 94.3 |
| T. Siltech J15-B high mol. wt. silicone quat & Alkanolamide. | 94.3 | | 98.0 |

EXAMPLE 1

Concentrate (1) was prepared by mixing methanol, water and PR 1145, (a water dispersible high molecular weight polydimethyl siloxane based quaternary ammonium compound and a water dispersible $C_8$–$C_{24}$ fatty based quaternary compound having a cationic functional group), together as follows:

| COMPONENT | WT % | ORDER |
|---|---|---|
| Methanol | 28.5 | 1 |
| Deionized Water | 66.7 | 2 |
| PR 1145 | 4.8 | 3 |
| | 100% | |

EXAMPLE 1(x)

An effective concentrate can be prepared by mixing methanol, water, PR 1145, (a water dispersible high molecular weight polydimethyl siloxane based quaternary ammonium compound and a water dispersible $C_8$–$C_{24}$ fatty based quaternary compound having a cationic functional group), and a surfactant other than a quaternary ammonium compound together as follows:

| COMPONENT | WT % | ORDER |
| --- | --- | --- |
| Methanol | 5–50 | 1 |
| Deionized Water | 5–50 | 2 |
| PR 1145 | .1–20 | 3 |
| Nonionic Surfactant | .1–20 | 4 |

EXAMPLE 1(y)

An effective concentrate can be prepared by mixing methanol, water, PR 1145, (a water dispersible high molecular weight polydimethyl siloxane based quaternary ammonium compound and a water dispersible $C_8$–$C_{24}$ fatty based quaternary compound having a cationic functional group), and a surfactant other than a quaternary ammonium compound together as follows:

| COMPONENT | WT % | ORDER |
| --- | --- | --- |
| Methanol | 45–50 | 1 |
| Deionized Water | 45–60 | 2 |
| PR 1145 | .1–10 | 3 |
| Nonionic Surfactant | .1–10 | 4 |

The order of addition is important in that the PR 1145 should not be added to methanol directly. The rate of addition and mixing speed should be slow. The final concentrate blend (1B) is obtained by adding Concentrate (1) to methanol water solutions at 10% by weight or less to formulate Concentrate blend (1B) which when added to a windshield washer solution of water, alcohol, or combination thereof to provide a diluted concentrate product exhibiting a wetting contact angle greater than water, typically greater than 20 degrees and preferably 70 degrees or more.

Moreover, the concentrate described in Examples 1, 1(x) and 1(y) can be diluted by adding it to a water, alcohol, or water and alcohol solution in an amount of from about 0.1 to 10.0 weight percent and more preferably in an amount of about 1% to provide effective repellent properties.

Some typical physical properties of the resulting Concentrate Blend (1B) solution are as follows:

| | |
| --- | --- |
| Density | 7.9 pounds/gallon |
| Non-Volatiles | 3.0 weight % |
| pH | 5.3 |
| Flashpoint | 140° F. |
| Viscosity (#2 Zahn Cup) | 16 @ 77° F., seconds |

Upon adding from 1 to 10 weight percent of Concentrate (1) to methanol and mixing, the resultant homogeneous Concentrate Blend (1B) is spotted on a laboratory glass dish and dried by hand. The dish is hydrophilic prior to treatment and is observed to noticeably bead water following exposure. No film is visible on the glass after treatment. Similar results were obtained at 10 wt percent of Concentrate (1B) in water, in isopropyl alcohol, and in ethanol. Further, the undiluted Concentrate (1B) leaves the glass water-repellent without subsequent dilution in common alcohols.

EXAMPLE 2

Surface Tension

Surface Tension was determined with a Du Nouy Tensiometer measured in dynes/$cm_2$ at 3 percent of finished Concentrate Blend (1B) in distilled water as specified in Chrysler MS-3037, Section 2.6. The composition of the instant invention was prepared using a 5% and 10% solution of the Concentrate Blend (1B) prepared as set forth in Example 1 in a methanol-water base. The 5% and 10% Solutions were compared with water as a negative control, and compared with a conventional water repellant product. The reduced surface tension exhibited by the 5% Solution and the 10% Solution implies enhanced ability to solvate dirt and deposits, in essence cleaning ability. The Chrysler specification sets forth as a standard a value of 36 dynes/$cm_2$ maximum. The test indicate that both the 5% Solution and the 10% Solution exhibited a 50% improvement as compared to water. It is anticipated that a greater percentage of Concentrate Blend (1B) would provide a greater improvement.

| SAMPLE | RESULT (DYNES/$CM^2$) | % IMPROVEMENT |
| --- | --- | --- |
| Distilled Water | 72 | 0 |
| Conventional De-Icer | 73 | −1.4 |
| Invention 10% | 49 | +32 |
| Invention 5% | 49 | +32 |
| Chrysler Specification | 36 Maximum | +50 |

EXAMPLE 3

Contact Angles

Dynamic contact angle measurements were performed on pieces of windshield glass dipped in different concentrations of the Concentrate Blend (1B) of Example 1 diluted in a solution of 60% distilled water/40% methanol. Windshield glass is provides a realistic test substrate surface, but reproducibility is a concern. As a control reference, water was used to wet the surface giving results of very low contact angles of from 10 to 15 degrees. As the hydrophobicity of the surface increases, the contact angles increase providing an indicator measuring the balling up of water droplets on the surface. Angles greater than 90 degrees are truly non-wetting. Advancing and receding angles were determined. The first trial results are reported as follows:

| CONCENTRATE (1B) | ADVANCING ANGLE | RECEDING ANGLE |
| --- | --- | --- |
| 1% | 78.62 | 45.57 |
| 2% | 82.41 | 51.87 |
| 3% | 54.09 | n/a |
| 4% | 68.72 | 51.37 |
| 5% | 78.67 | 57.06 |
| 6% | 114.91 | 91.93 |
| 7% | 75.54 | 53.4 |
| 8% | 64.63 | 47.43 |
| 9% | 78.75 | 56.11 |
| 10% | 81.78 | 57.78 |
| 12% | 75.94 | 57.25 |
| Average | 77.6 | 56.9 |

The results show that water beads over a broad range of Concentrate Blend (1B) compositions. The results are variable, suggesting that greater angles are possible and that the film obtained by dipping and draining might be substantially improved with multiple applications as by spraying on an automotive windshield and subsequent wiper action. However, it remains that a high energy, water-repellent surface is obtained simply by dipping the glass substrate test surface into the solution containing Concentrate Blend (1B) and air drying the dipped glass substrate. The values obtained over the broad operational range is useful for determining additions of additive-containing fluid to partially full reservoirs containing untreated fluid.

For instance, in U.S. Pat. No. 3,950,588, it was reported that the contact angle changed from 11 degrees for water on a borosilicate microscope slide to 98 degrees upon application of a water repellant treatment. These slides are likely a smoother, more reproducible surface than the windshield glass used in this study, but the results are similar. Further, his results were obtained for a dipped, dried and hand buffed treatment which can polish imperfections and fill surface voids to give a better finish and higher contact angles.

It is also reported that the contact angle results for RAIN-X, a commercially available water repellant treatment that the instant invention would replace with spray-on convenience. It is reported in the '588 patent that the contact angle decreases from 92 degrees to 68 degrees after 5 cycles and 45 degrees after 10 cycles. The results obtained for the invention as set forth in the 5% and 10% Solutions prepared with Concentrate (1B) are similar to those for RAIN-X, a very successful repellent treatment in the automotive aftermarket.

EXAMPLE 4

Vehicle Application

A mixture of 420 milliliters (mls) of the Concentrate Blend (1B) of Example 1 and 3.78 liters (L) of commercial blue aqueous methanol windshield washer solvent were mixed together. Approximately one half gallon was charged into the nearly empty reservoir of a 1990 Subaru Legacy. The front windshield was cleaned with a glass polishing compound and finished with a clean cloth and a commercial ammonia-based glass cleaner. The exterior of the window was observed to be wetted with water. Approximately one quarter of the surface was sprayed on the windshield and the reservoir refilled. The glass surface was observed to readily bead water. The wipers were replaced. In moderate rain at 35 to 40 MPH, the larger droplets moved off the windshield. At 45 to 50 MPH the droplets were quickly removed. Visibility was good, driving in the rain without using wipers. Larger drops are moved with wind force better and at lower speeds than smaller droplets. In all cases, water is observed to bead on the glass.

EXAMPLE 5

Vehicle Application

A 1994 Chrysler Town and Country was tested by adding 200 mls. of the Concentrate Blend (1B) of Example 1 to the washer fluid reservoir. The reservoir was mostly full with a commercial blue methanol/water based solvent. The mixture was stirred by hand. The windshield was not cleaned. The fluid containing the Concentrate Blend (1B) was squirted two or three times on the windshield to create the water repellent coating prior to driving in heavy rain. Rain was observed to bead on the glass. Larger droplets were removed by driving without the wipers operating. When the wipers were turned on, very small droplets not removed by driving were coalesced and immediately removed. At 50 to 60 MPH, visibility was acceptable with the wipers off and excellent with them on.

EXAMPLE 6

Storage Stability

The Concentrate Blend (1B) prepared as set forth in Example 1 was stability-tested at room temperature and 150° F. at 100% and at 10% dilution in commercial blue aqueous methanol solvent. The samples were clear and free of deposits and precipitates for over five months. The test was then terminated. Such stability is needed for underhood applications, particularly where the coolant overflow bottle and solvent reservoir are divisions of the same plastic container.

EXAMPLE 7

Fleet Test

The Concentrate (1) prepared as set forth in Example 1 was modified to include a non-ionic surfactant, Nonylphenol+9 EO Polyethoxylate, ("N-95") forming Concentrate (2). The surfactant aids in clarifying the solution and will improve cleaning, building on the results of Example 2. The freeze point for Concentrate (2) was improved to −40° F. by increasing the methanol loading to 40%. The freeze point can be varied widely by altering the proportions of methanol to water.

| COMPONENT | WT % | ORDER |
| --- | --- | --- |
| Modified Concentrate (2) | | |
| Methanol | 40.0 | 1 |
| Deionized Water | balance | 2 |
| PR 1145 | 4.8 | 3 |
| Nonionic Surfactant | 1.0 | 4 |
| Dye | 0.002 | 5 |
| | 100% | |
| Concentrate Blend (2B) | | |
| Methanol | 40 | 1 |
| Concentrate (2) | 5% or 10% | 2 |
| Deionized Water | balance | 3 |
| | 100% | |

A total of fifty-six vehicles were used to evaluate the above formula at 5% (16 vehicles) and 10% (28 vehicles) concentrate levels and a control. The control was a commercially available premium windshield solvent, PRESTONE De-Icer (12 vehicles). The average vehicle population was model year 1992 with 69,000 miles. The vehicle mix was 85% domestic and 15% imported.

The windshields were required to be free of cracks and the wipers/washer in good working order as selection criteria. The windshield was cleaned prior to testing and new wiper blades installed, NAPA part # 60-022-14. The windshield preparation was standardized as follows:

1. water applied
2. cleaned with a soft brush and NAPA Upholstery cleaner #3700
3. water rinsed
4. cleaned with Bon Ami cleaner and wet sponge
5. water rinsed
6. cleaned with WINDEX and paper towels
7. interior of the windshield cleaned with Windex and paper towels The existing washer solvent was purged and the test product added. Makeup test solvent was supplied to each vehicle. Participants were told to use the product as weather conditions dictated. During the evaluation, participants were queried from a standard questionnaire to determine positive and negative observations. Participants were not informed about the product they were testing.

The questionnaire was circulated in late October and early November and the response rate was 75% returned. The results are tabulated below.

| PRODUCT | WATER BEADS | WATER SHEDS | SHEDS MPH | ODOR | CLEANS ROAD OIL | CLEANS INSECTS | CLEANS DIRT |
|---|---|---|---|---|---|---|---|
| 10% | 96% | 96% | 36 | 0% | 52% | 52% | 98% |
| 5% | 89% | 100% | 35 | 0% | 25% | 25% | 63% |
| PRESTONE | 56% | 33% | 35 | 11% | 25% | 44% | 67% |

From the survey, it is clear that the water repellent feature is noticeable in the invention as set forth in Concentrate Blend (2B) as compared to the PRESTONE product. Also the cleaning is better than the commercial product, particularly at 10% on dirt and oil.

EXAMPLE 8

Alcohol Compatibility

The formulations utilizing the chemistry of the instant invention are likely to be used in methanol and water mixtures in North America. However, it may be useful to disperse the quaternary compounds, siloxane based quaternary ammonium compounds, fatty quaternary ammonium compounds, and mixtures thereof in water or pure methanol to prepare concentrates for production or treatments for various application purposes. It might be desirable to apply the water repellent coating by hand via a spray bottle or other manual applicator to side or rear windows lacking sprayers. In Europe ethanol is used for lower toxicity. Isopropyl alcohol is often used in North America in conjunction with methanol to reduce freeze point. The concentrate blend (1) of example 1 has been added to water, methanol ethanol and isopropyl alcohol at 10%. In all cases it leaves a water-repellent coating on glass. The concentrate dissolved to form a clear mixture in each example.

EXAMPLE 9

Additional Surfactants

An ethoxylated nonylphenol with an HLB of approximately 13 is a preferred surfactant. A variety of other surfactants, including glycol ethers of other coupling agents can be added to increase detergency. The cationic nature of the quaternary compounds, siloxane based quaternary ammonium compounds, fatty quaternary ammonium compounds, and mixtures thereof dictates non-ionic or cationic materials are preferred to provide optimal performance. Other suitable surfactants such as Glycol ether EB was used to replace the non-ionic surfactant in example 7. This modified formulation was found to give improved cleaning and shows how the basic invention can be modified without departing from the scope of the invention.

| Modified Formulation Concentrate (3) | | |
|---|---|---|
| COMPONENT | WT % | ORDER |
| Methanol | 40 | 1 |
| PR 1145 | 5 or 10 | 2 |
| Deionized Water | balance | 3 |
| Glycol Ether | 2 | 4 |

EXAMPLE 10

Lower Limit of Efficacy

Dynamic contact angles were determined on glass microscope slides to better elucidate the limits of efficacy for the Concentrate Blend (2B) of Example 7 at several levels in the final mixture. For example, 10% con denotes that 10% of the Concentrate Blend (2B) in Example 7 was added to a 40% methanol/50% water solution to prepare the test fluid. The slides were washed with distilled water and dried before use. Controls of water and a hand-polished glass treatment, RAIN-X were included. Also, another competitive product, "CAR and DRIVER" windshield washer fluid which claims to repel water with a RAIN X additive was evaluated. Some measurements were repeated to obtain second and third sequential measurements. Slides were dipped into liquid and hand-dried with tissues prior to testing. RAIN X and the pure PR 1145 were applied by hand with significant polishing to obtain a clear slide.

| | DYNAMIC CONTACT ANGLE MEASUREMENT | | |
|---|---|---|---|
| SAMPLE | 1 | 2 | 3 |
| water | 23.22 | 23.52 | |
| RAIN X | 92.21 | 107.55 | 105.98 |
| PR 1145 | 79.57 | 87.97 | 86.18 |
| 10% con | 81.60 | 80.76 | |
| 5% con | 88.53 | 87.74 | |
| 1% con | 87.86 | | |
| 0.1% con | 81.59 | 87.27 | 86.18 |
| 0.01% con | 77.40 | | |
| 0.001% con | 39.58 | | |
| Car & Driver | 21.34 | | |
| CAR & DRIVER + 1% con | 86.52 | | |

The results show that levels as low as 0.01% (48 ppm active) of Concentrate Blend (2B) produce a hydrophobic surface. Also that the water beading approaches closely that of RAIN-X, a laboriously hand-applied coating. The limit of lower use is probably around 0.001% (4.8 ppm) of Concentrate Blend (2B). The CAR and DRIVER fluid did not modify contact angles significantly in the test. It is rendered water repellent as the example shows with a 1% addition of the Concentrate Blend (1B) of Example 1.

It follows that minimal formulations that do not include surfactant and contain a low amount of PR 1145 can be implemented as follows:

| | WT % |
|---|---|
| CONCENTRATE COMPONENT (4) | |
| Distilled Water | Balance |
| MeOH | 0 to 99.9 |
| PR 1145 | 0.1 |
| | 100% |

-continued

| | WT % |
|---|---|
| Final Concentrate Blend 4(B) | |
| Distilled Water | Balance |
| MeOH | 0 to 90 |
| Concentrate | 10 |
| | 100% |

It is not necessary to prepare a concentrate and the water dispersible high molecular weight polydimethyl siloxane based quaternary ammonium compound and a water dispersible $C_8$–$C_{24}$ fatty based quaternary compound having a cationic functional group, (PR 1145), can simply be added to the final blend directly.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:

1. A water repellent composition for forming an optically clear, water repellant film on a clear or translucent glass or polymer substrate, comprising a quaternary ammonium compound concentrate and a nonionic surfactant in solution with a solvent dispersible in water, alcohols, and water-alcohol mixtures imparting a degree of hydrophobicity to a windshield surface providing a wetting surface having a contact angle of at least 50 degrees upon diluting to 15 percent or less as compared to water having a contact angle of from 10 to 15 degrees.

2. The water repellent composition of claim 1, wherein said quaternary ammonium compound is selected from the group consisting of silicon based quaternary ammonium compounds, siloxane based quaternary ammonium compounds, fatty quaternary ammonium compounds, and mixtures thereof.

3. The water repellent composition of claim 1, wherein the composition is clear.

4. The water repellent composition of claim 1, further including a detergent.

5. The water repellent composition of claim 1, further including a dye in an amount of between 0.1 to 1.0 percent by weight.

6. The water repellent composition of claim 1, wherein said composition has a pH in the range of from between 6.0 to 9.0.

7. The water repellent composition of claim 1, wherein said composition has a pH in the range of from between 7.0 to 8.0.

8. The water repellent composition of claim 1, wherein said composition is stable at temperatures of at least 150° F.

9. The water repellent composition of claim 1, wherein said composition does not separate on standing.

10. The water repellent composition of claim 1, wherein said composition being compatible with conventional automotive windshield washer solvents.

11. The water repellent composition of claim 1, wherein said composition provides a wetting surface having a contact angle of at least 50 degrees.

12. The water repellent composition of claim 1, wherein said composition provides a wetting surface having a contact angle which is greater than that of water when added to a solution of water, alcohols, or a water and alcohol mixture in a concentration of at least 0.001 percent.

13. The water repellent composition of claim 1, wherein said composition is added to a conventional windshield washer solution of water, alcohols, or a water and alcohol mixture in an amount of between 0.01 percent and 1.0 percent by volume.

14. The water repellent composition of claim 1, said composition providing a wetting surface having a contact angle of at least 50 degrees as compared to water having a contact angle of from 10 to 15 degrees upon addition to a solution of water, alcohol, or a water and alcohol mixture in an amount of from 0.001 to 15.0 percent by volume.

15. The water repellent composition of claim 1, wherein said quaternary ammonium compound is a polydimethyl siloxane having a molecular weight ranging from 300 to 500,000.

16. The water repellent composition of claim 2, wherein said fatty quaternary ammonium compound ranges from $C_8$ to $C_{24}$.

17. The water repellent composition of claim 16, wherein said fatty quaternary ammonium compounds are selected from the group consisting of mono and/or di-alkyl amido amine quats, imidazoline quats, di-amido quats, di-methyl ammonium chloride quats, tri-methyl ammonium chloride quats, di-methyl benzyl quats.

18. The water repellent composition of claim 16, wherein said fatty quaternary ammonium compound is a pentavelent nitrogen ring compound.

19. The water repellent composition of claim 18, wherein said pentavelent nitrogen ring compound is lauryl pyridinium chloride.

20. The water repellent composition of claim 1, further including a bittering agent in amount of between 0.1 and 3.0 percent by weight.

21. The water repellent composition of claim 2, wherein said quaternary ammonium compound is a polydimehtyl siloxane with a fatty acid and a weight distribution of between 300 and 2000.

22. A water repellent composition for forming an optically clear, water repellant film on a clear or translucent glass or polymer substrate, comprising:
a water dispersible high molecular weight polydimethyl siloxane based quaternary ammonium compound in an amount of from between 5 and 85 percent by weight;
an alcohol solvent in an amount of between 1.0 to 50.0 percent by weight;
a water dispersible $C_8$ to $C_{24}$ fatty based quaternary compound having a cationic functional group in an alcohol solvent in an amount of from between 1.0 and 50.0 percent by weight; and a surfactant other than a quaternary ammonium compound in an amount of from between 0.01 to 10 percent by weight.

23. The water repellent composition of claim 22, wherein said alcohol solvent is dipropylene glycol.

24. The water repellent composition of claim 22, including an alkanolamide present in an amount of from between 1.0 and 99.0 percent by weight.

25. The water repellent composition of claim 1, wherein said quaternary ammonium compound is at least one quaternary ammonium compound selected from the group consisting of a low molecular weight silicon quat, a nonsilicon alkyl amido dimethyl quat, a blend of a low molecular weight silicon quat and a nonsilicon alkyl amido dimethyl quat, a blend of a nonsilicon dialkyl amido amine quat and a high molecular weight silicon quat, a nonsilicon dialkyl amido amine quat, a high molecular weight silicon quat, a blend of a high molecular weight silicon quat in a dipropylene glycol solvent and a dialkyl amido amine quat, a high molecular weight silicon quat in an alcohol solvent, a high molecular weight silicone quat in a dipropylene glycol solvent, a high molecular weight silicone quat, a dialkyl imidazoline quat, an alkyl dimethyl benzyl quat, a dialkyldimethyl quat, an alkyl trimethyl quat.

26. The water repellent composition of claim 22, wherein said surfactant is a nonionic surfactant.

27. The water repellent composition of claim 26, wherein said nonionic surfactant is present in an effective amount of from between 0.01 to 10 percent by weight selected from the group consisting of an ethoxylated nonylphenol, a glycol ether EB, a silicon surfactant, nonylphenol+9 EO polyethoxylate, a non-ionic surfactant, and combinations thereof.

28. A water repellent composition for forming an optically clear, water repellant film on a clear or translucent glass or polymer substrate, comprising an effective amount of a quaternary ammonium compound concentrate and a non-ionic surfactant in solution with a solvent dispersible in water, alcohols, and water-alcohol mixtures imparting a degree of hydrophobicity to a windshield surface providing a wetting surface having a contact angle greater than water upon final dilution as compared to water having a contact angle of from 10 to 15 degrees.

* * * * *